US008882626B2

(12) United States Patent
Winter (10) Patent No.: US 8,882,626 B2
(45) Date of Patent: Nov. 11, 2014

(54) CONTINUOUSLY VARIABLE RATIO TRANSMISSION

(75) Inventor: Philip Duncan Winter, Blackburn (GB)

(73) Assignee: Torotrak (Development) Limited, Lancashire (GB)

( * ) Notice: Subject to any disclaimer, the term of this patent is extended or adjusted under 35 U.S.C. 154(b) by 0 days.

(21) Appl. No.: 13/321,375

(22) PCT Filed: May 18, 2010

(86) PCT No.: PCT/GB2010/050809
§ 371 (c)(1),
(2), (4) Date: Jan. 24, 2012

(87) PCT Pub. No.: WO2010/133873
PCT Pub. Date: Nov. 25, 2010

(65) Prior Publication Data
US 2012/0142477 A1    Jun. 7, 2012

(30) Foreign Application Priority Data

May 19, 2009  (GB) .................................. 0908581.2

(51) Int. Cl.
*F16H 15/52*  (2006.01)
*F16H 37/08*  (2006.01)
*F16H 37/10*  (2006.01)

(52) U.S. Cl.
CPC ........ *F16H 37/086* (2013.01); *F16H 2037/104* (2013.01)
USPC .......................................... 475/216; 475/192

(58) Field of Classification Search
USPC ......................................... 475/214–219, 192
See application file for complete search history.

(56) References Cited

U.S. PATENT DOCUMENTS

| 5,159,855 | A | * | 11/1992 | Nikolaus et al. ................ 475/78 |
| 5,643,121 | A | * | 7/1997 | Greenwood et al. ......... 475/214 |
| 5,720,687 | A | | 2/1998 | Bennett | |
| 6,045,477 | A | | 4/2000 | Schmidt | |
| 6,217,473 | B1 | * | 4/2001 | Ueda et al. .................... 475/216 |

(Continued)

FOREIGN PATENT DOCUMENTS

JP     2006300268 A     11/2006

OTHER PUBLICATIONS

International Search Report; International Application No. PCT/GB2010/050809; dated Aug. 17, 2010.

(Continued)

*Primary Examiner* — Jacob S Scott
(74) *Attorney, Agent, or Firm* — Brooks Kushman P.C.

(57) ABSTRACT

A multi-regime continuously variable ratio transmission has a transmission input shaft, a transmission output shaft, and a ratio varying unit having a rotating input and a rotating output, the rotational axes of the input and the output being coaxial. A shunt having first and second epicyclic gear sets is connected across the ratio varying unit. One gear set has an input driven by the input shaft and an input driven by one side of the ratio varying unit and the other gear set has an input from the first gear set and an input from one side of the ratio varying unit. The gear sets rotate about a common axis and are offset with respect to, and parallel to, the rotational axes of the input and output of the ratio varying unit. A clutch is operable to selectively connect the output of the second gear set to the output shaft.

18 Claims, 4 Drawing Sheets

(56) References Cited

U.S. PATENT DOCUMENTS

| | | | |
|---|---|---|---|
| 6,540,639 B1* | 4/2003 | Gumpoltsberger | 475/216 |
| 7,410,446 B2* | 8/2008 | DeMarco | 477/98 |
| 2004/0142785 A1 | 7/2004 | Inoue | |
| 2008/0146399 A1* | 6/2008 | Oliver et al. | 475/216 |

OTHER PUBLICATIONS

International Preliminary Report on Patentability; International Application No. PCT/GB2010/050809; dated Nov. 22, 2011.

* cited by examiner

CONTINUOUSLY VARIABLE RATIO TRANSMISSION

CROSS REFERENCE TO RELATED APPLICATIONS

This application is the U.S. national phase of PCT application no. PCT/GB2010/050809 filed May 18, 2010; which claims priority to Great Britain application GB 0908581.2, filed May 19, 2009.

BACKGROUND OF THE INVENTION (1) Field of the Invention

The present invention relates to continuously variable ratio transmissions and in particular, but not exclusively, to continuously variable ratio transmissions used in large vehicles in the construction industry, commonly known as "wheel loaders".

(2) Description of Related Art

A wheel loader is a vehicle, often used in construction, that is primarily used to load and move bulk material. It normally comprises a tractor having an adjustable bucket, snow plough or other attachment adjustably connected to its front end.

In wheel loaders, the physical constraints imposed on its construction result in the engine normally being mounted well above the driven wheels. Consequently, the transmission needs to provide for a vertical drop, typically of approximately 50 cm, from the engine output shaft to the shaft driving the wheels. In conventional transmissions for wheel loaders, gearing arrangements can be conveniently located in the vertical drop.

BRIEF SUMMARY OF THE INVENTION

Wheel loaders are commonly required to "shuttle" backwards and forwards during use, which requires repeated engagement and disengagement of clutches at relatively low speeds and high torques.

It is an object of the present invention to provide a continuously variable ratio transmission which allows "shuttling" to take place conveniently and yet which accommodates the vertical drop normally present between the output of the engine and the driven wheels in such arrangements.

In accordance with the present invention, there is provided a multi-regime continuously variable ratio transmission (CVT) comprising:

a transmission input shaft;

a transmission output shaft;

a ratio varying unit having a rotating input and a rotating output, the rotational axes of the input and the output being coaxial;

a shunt comprising first and second epicyclic gear sets connected across the ratio varying unit, one epicyclic gear set comprising an input driven by the transmission input shaft and an input driven by one side of the ratio varying unit and the other epicyclic gear set comprising an input from the first epicyclic gear set and an input from one side of the ratio varying unit, the first and second epicyclic gear sets rotating about a common axis and being offset with respect to, and parallel to, the rotational axes of the input and output of the ratio varying unit; and a clutch for selectively connecting the output of the second epicyclic gear set to the transmission output shaft.

Use of a ratio varying unit, such as a variator, allows "shuttling" of the transmission to take place at low speeds, without the requirement for changing clutches. Moreover, the provision of a double shunt in the form of first and second epicyclic gear sets moderates the power recirculated through the variator at low speeds, which is desirable when high torque is applied.

Moreover, the present invention allows a construction which accommodates the vertical drop present in the known transmissions.

Preferably, the transmission further comprises one or more clutches for selectively connecting the output of the variator to a transmission output shaft.

Preferably, selective engagement of the clutches produces a plurality of overlapping ratio ranges.

In a preferred embodiment, the ratio varying unit comprises a rotatable input disc, a rotatable output disc mounted coaxially with the input disc and a plurality of rollers of variable inclination transmitting rotation between the input disc and the output disc.

The input disc and the output disc are preferably mounted on a hollow shaft and the transmission input shaft passes through the hollow shaft.

In one embodiment, the output of each of the clutches is adapted to drive a common rotatable member and wherein the transmission further comprises a forward clutch and reverse clutch located between the common member and the transmission output shaft.

This arrangement allows the outputs from the second epicyclic gear set and/or the ratio varying unit to be applied in a forward direction or a reverse direction, as required, by suitable application of the forward or reverse clutch. In particular, it can significantly increase the ratios which can be achieved in reverse.

Preferably, the first and second epicyclic gear sets are located below the ratio varying unit. This arrangement utilises the vertical drop which is commonly present between the engine output shaft and the driven wheels in transmissions for wheel loaders.

BRIEF DESCRIPTION OF THE SEVERAL VIEWS OF THE DRAWINGS

By way of example only, specific embodiments of the present invention will now be described, with reference to the accompanying drawings, in which.

DETAILED DESCRIPTION OF THE INVENTION

Figure 1:
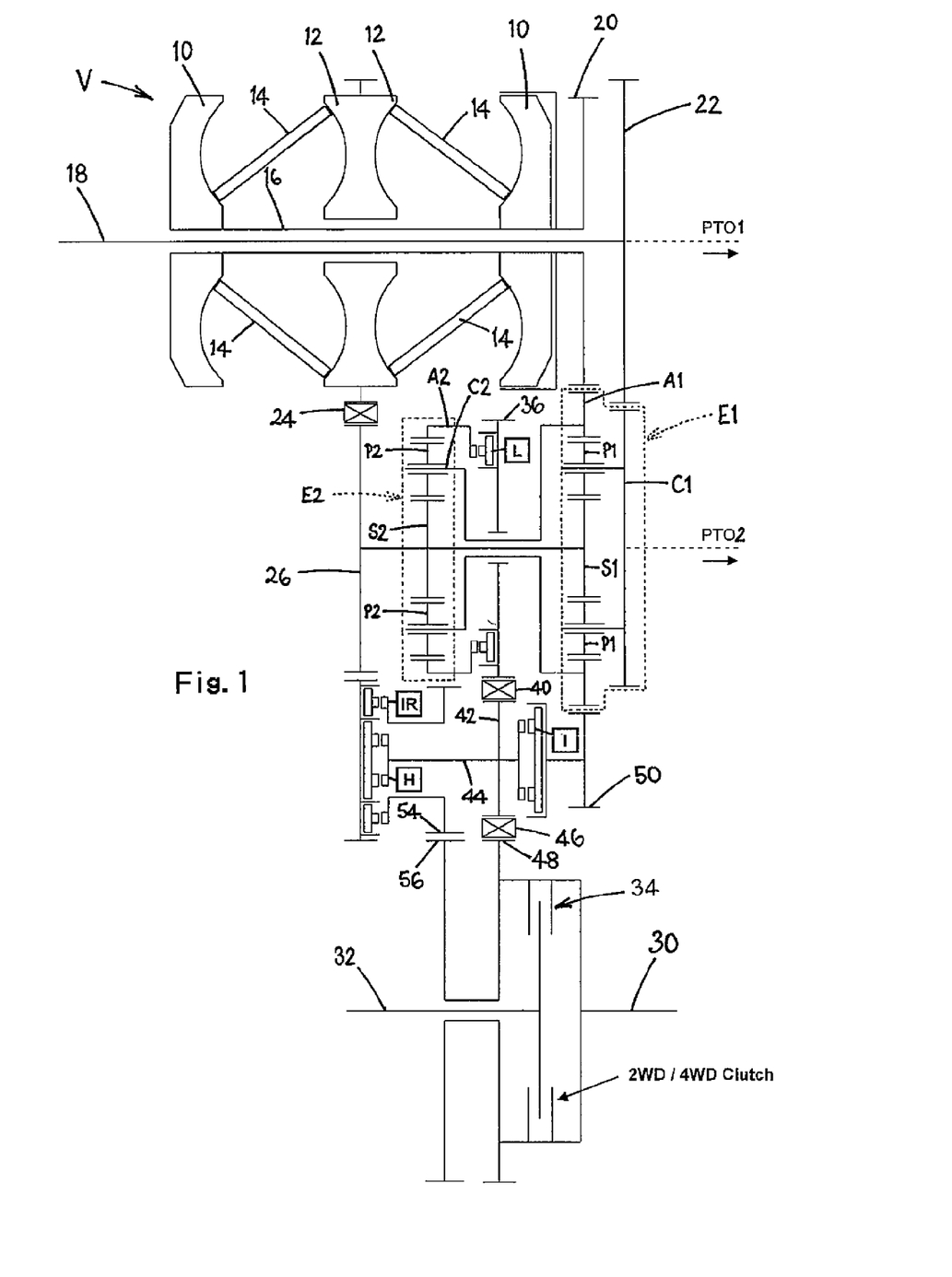
FIG. 1 is an illustration of a first embodiment of infinitely variable transmission in accordance with the present invention.
Figure 2:
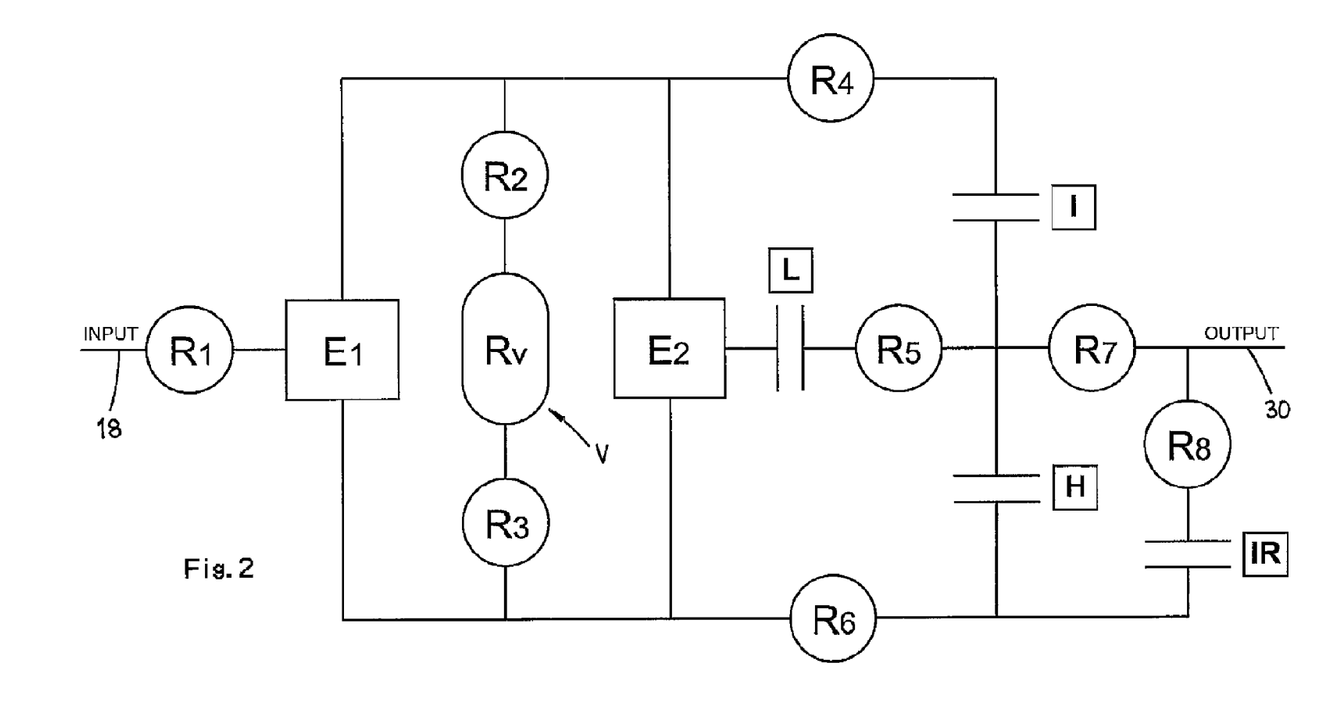
FIG. 2 is a schematic representation of the transmission of FIG. 1.

Referring firstly to FIGS. 1 and 2, a continuously variable ratio transmission system comprises a variator V for a variator Rv as shown in FIG. 2) of the known toroidal race rolling traction type having two toroidally-recessed input discs 10, one arranged at each end of the variator, and a pair of similar output discs 12, each facing a respective one of the input discs 10 and rotating with each other.

Sets of rollers 14 (typically three rollers) are mounted between the opposing faces of the input and output discs 10, 12 to transmit drive from the input discs to the output discs 12 with a ratio which is variable by tilting the rollers 14. The input discs 10 are mounted at either end of a hollow shaft 16 and an input shaft 18. Input shaft 18 is driven by an engine or other prime mover (not illustrated), via reduction gearing R1 shown in FIG. 2, and passes coaxially through the hollow shaft 16.

The input discs 10 are rotated by the output of a double shunt across the variator in the form of first and second epicyclic gear sets E1, E2 via reduction gearing R2, R3 shown in FIG. 2. The first epicyclic gear set E1 comprises a sun gear S1, a plurality of planet gears P1 rotatably mounted on a carrier C1 and an annulus A1 which engages with an input gear 20 connected to and rotatable with, the input discs 10 of the variator V. The carrier C1 engages with, and is rotated by, an output gear 22 connected to the input shaft 18 and the sun gear S1 is connected to, and rotates with, the output discs 12 of the is variator V via an idler gear 24 engaged with an intermediate gear 26. Consequently, rotation of the annulus A1 of the first epicyclic gear set E1 (and consequently the speed of the input discs 10) of the variator is dependent on speed of the input shaft 18 and the output of the variator V. As shown in FIG. 1, the input shaft 18 and the carrier C1 of the first epicyclic gear set E1 can also be used as power take-off sources PTO1, PTO2 if desired.

The annulus A1 of the first epicyclic gear set E1 is also connected to the carrier C2 of a second epicyclic gear set E2, whose sun gear 52 is connected to, and rotates with, the sun gear S1 of the first epicyclic gear set and with the output of the variator V. A plurality of planet gears P2 are rotatably mounted on the carrier C2 and mesh with the sun gear S2 and with an annulus A2 which forms the output of the second epicyclic gear set E2.

The epicyclic gear sets E1 and E2 are located below, i.e. underneath, the variator V.

As will be explained, by providing a plurality of clutches, drive can be transmitted from the first and second epicyclic gear sets E1, E2 and from the output discs 12 of the variator to a final output shaft 30 of the transmission arranged in parallel with the input shaft 18. Optionally, rotation of the final transmission output shaft 30 can also selectively be imparted to a further, coaxial output shaft 32 by means of a further clutch 34, for example to provide four-wheel drive when desired.

The output of the second epicyclic gear set E2, formed by the annulus A2, is connected to one side of a low-regime dog clutch L. The other side of the low-regime clutch L is secured to an intermediate gear 36 which is engaged via a first idler gear 40 to a further intermediate gear 42 (i.e., reduction gearing R5 shown in FIG. 2) which rotates with an intermediate output shaft 44 which engages via a further idler gear 46 with a transfer gear 48 (i.e., reduction gearing R7 shown in FIG. 2) which is connected to the transmission output shaft 30. By engaging the low-regime clutch L, the output of the second epicyclic gear set E2 can thereby be transmitted to the transmission output shaft 30 via reduction gearing R7.

The output of the first epicyclic gear set E1, formed by annulus A1, is transmitted via intermediate gear 50 to one side of an intermediate-regime dog clutch I via reduction gearing R4 shown in FIG. 2, the other side of the intermediate clutch I being connected to the intermediate output shaft 44. Consequently, by engagement of the intermediate clutch I, the output of the first epicyclic gear set E1 (the rotation of the annulus A1) can be transmitted to the transmission output shaft 30 via reduction gearing R7.

The intermediate gear 26 rotatable by engagement with the output discs 12 of the variator V (via the idler gear 24) is also arranged to engage with, and rotate, one common side of a high regime dog clutch H and an intermediate reverse dog clutch IR via reduction gearing R6 shown in FIG. 2. The opposite side of the high regime clutch H is connected directly to the intermediate output shaft 44 and engagement of the high regime clutch thereby transmits the rotation of the variator output directly to the transmission output shaft 30.

The opposite side of the intermediate reverse clutch IR is connected to, and rotates, an intermediate gear 54 which engages with a further transfer gear 56 (i.e., reduction gearing R8 shown in FIG. 2) connected to the transmission output shaft 30.

In operation, only one of the low-regime clutch L, the intermediate regime clutch I, the intermediate reverse clutch IR and the high-regime clutch H is normally engaged at any one time.

In low-regime operation, only the low-regime clutch L is engaged, which provides an output to the transmission output shaft 30 corresponding to the output (the annulus A2) of the second epicyclic gear set E2 via the intermediate shaft 44. As the rollers of the variator V move, the ratio of the variator can change from reverse, through geared neutral, to low forward ratio.

When the low-regime clutch L is engaged, the highest forward ratio of the variator corresponds to the lowest ratio of the variator when the intermediate clutch I is engaged. Consequently, in order to increase ratio, the low regime clutch L is disengaged and the intermediate clutch I is engaged. This connects the output of the first epicyclic gear set (the annulus A1) to the output shaft 30 via the intermediate shaft 44 and the variator rollers can then sweep in the opposite direction to take the ratio from intermediate forward ratio to the Lower end of the next highest ratio range.

When the intermediate regime clutch I is engaged, the highest ratio of the intermediate range corresponds to the lowermost ratio of the next highest regime. In order to increase the effective ratio, the high regime clutch H is engaged and the intermediate regime clutch I is disengaged. This connects the output of the variator V to the output shaft 30 via the intermediate shaft 44 and the rollers of the variator can then sweep in the opposite direction to take the ratio from the lower end of the high regime to an even higher ratio.

On the other hand, if the transmission is in low regime with the low regime clutch L engaged, the position of the variator corresponding to the maximum reverse ratio of low regime corresponds to the numerically smallest reverse ratio of the next lowest reverse regime. In order to increase the negative ratio, the intermediate reverse clutch IR is engaged and the low-regime clutch L is disengaged, which connects the output of the variator V to the output shaft 30 via the intermediate gear 54 and transfer gear 56, which allows the transmission to operate in a higher reverse ratio than the low regime will allow.

The transmission can be "shuttled" very quickly between forward and reverse operation, if desired, with a reduced requirement for engagement and disengagement of clutches. The addition of the intermediate reverse ratio also allows a relatively high reverse ratio to be achieved. On the other hand, the incorporation of the high regime ratio allows the vehicle to travel at relatively high speeds in the forward direction.

Moreover, the use of a double shunt across the variator recirculates power through the variator and limits the power passing through it. This allows a variator of reduced size to be used, particularly in vehicles such as excavators which are often required to deliver high torque when moving at low or zero road speed.

Moreover, the arrangement of the shunt offset to, but parallel to, the variator, permits the transmission system to be constructed in an envelope which is within the envelope of existing, conventional gearing arrangements.

Figure 3:
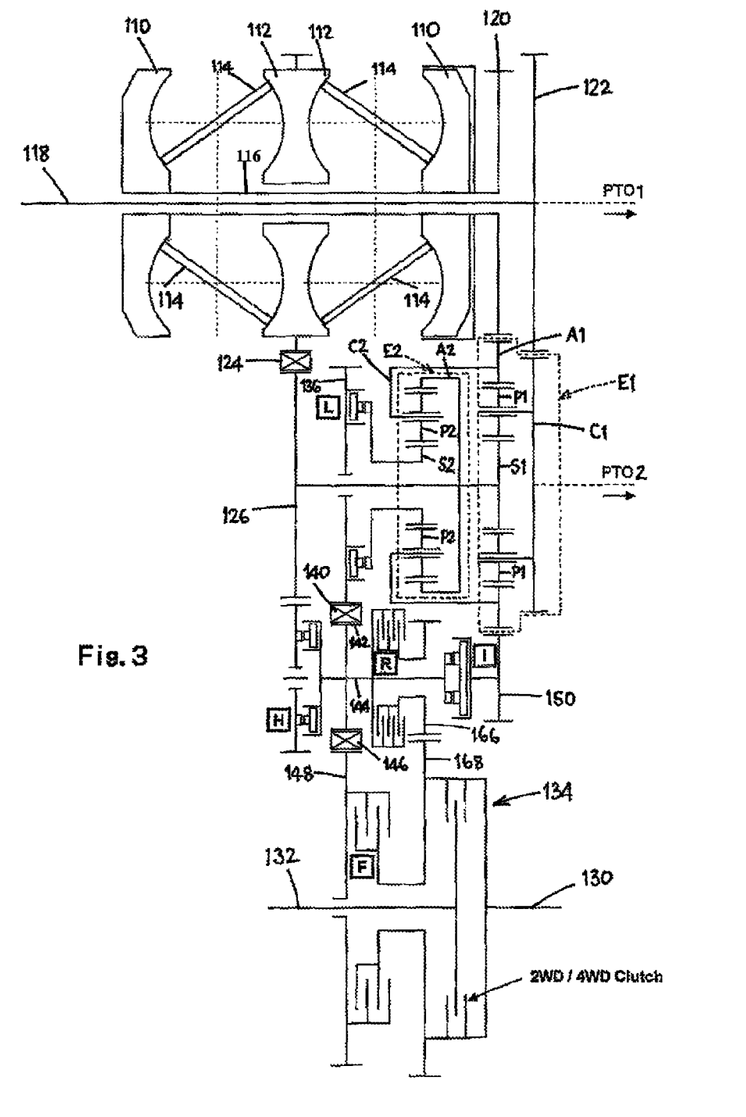
FIG. 3 is an illustration of a second embodiment of infinitely variable transmission in accordance with the present invention.
Figure 4:
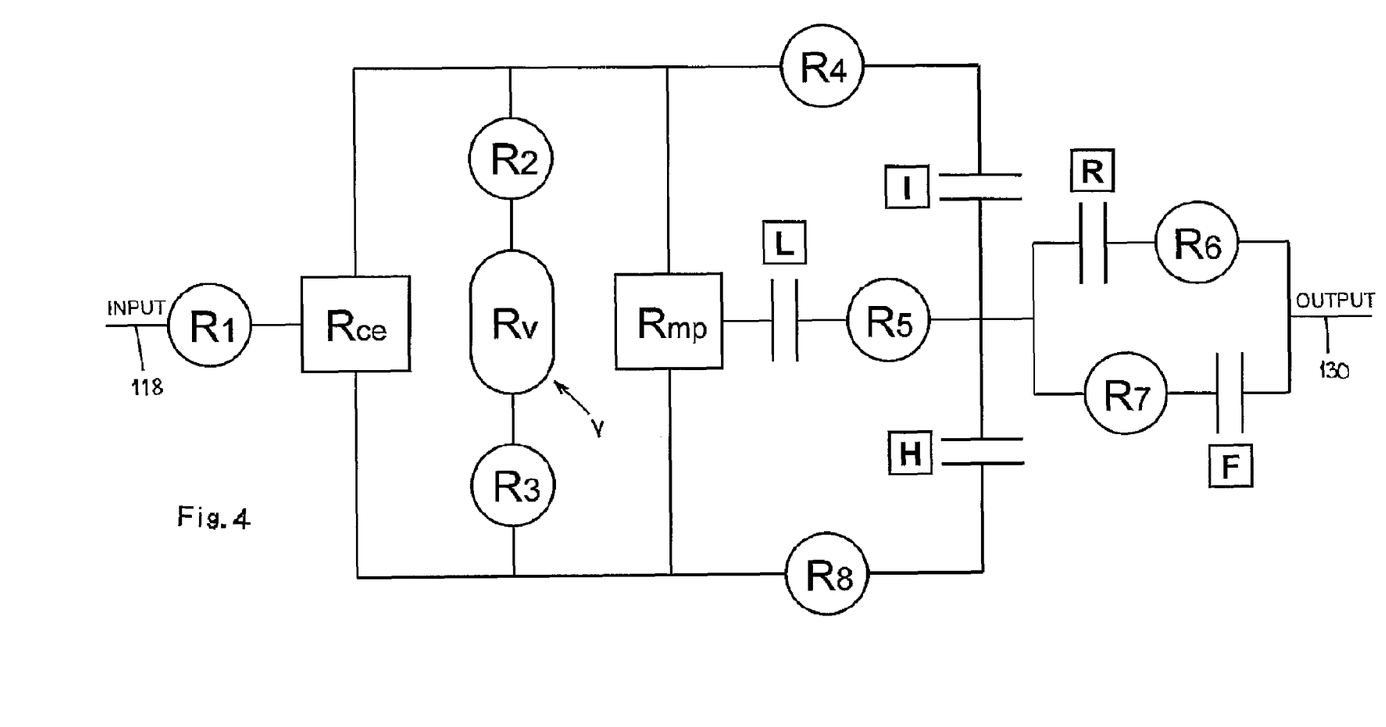
FIG. 4 is a schematic representation of the transmission of FIG. 3.

A second embodiment of the present invention is illustrated in FIGS. 3 and 4. The construction is similar in many respects to the first embodiment and comprises a variator V (or a variator Rv as shown in FIG. 4) of the known toroidal race rolling traction type having two toroidally-recessed input discs 110, one arranged at each end of the variator, and a pair of similar output discs 112, each facing a respective one of the input discs 110 and rotating with each other.

Sets of rollers 114 (typically three rollers) are mounted between the opposing faces of the input and output discs 110, 112 to transmit drive from the input discs to the output discs 112 with a ratio which is variable by tilting the rollers 114. The input discs 110 are mounted at either end of a hollow shaft 116 and an input shaft 118. Input shaft 118 is driven by an engine or other prime mover (not illustrated), via reduction gearing R1 shown in FIG. 4, and passes coaxially through the hollow shaft 116.

The input discs 110 are rotated by the output of a double shunt across the variator in the form of first and second epicyclic gear sets E1, E2 (or first and second epicyclic gear sets Rce, Rmp as shown in FIG. 4) via reduction gearing R2, R3 shown in FIG. 4. The first epicyclic gear set E1 comprises a sun gear S1, a plurality of planet gears P1 rotatably mounted on a carrier C1 and an annulus A1 which engages with an input gear 120 connected to and rotatable with, the input discs 110 of the variator V. The carrier C1 engages with, and is rotated by, an output gear 122 connected to the input shaft 118 and the sun gear S1 is connected to, and rotates with, the output discs 112 of the variator V via an idler gear 124 engaged with an intermediate gear 126. Consequently, rotation of the annulus A1 of the first epicyclic gear set E1 (and consequently the speed of the input discs 110) of the variator is dependent on speed of the input shaft 118 and the output of the variator V. As shown in FIG. 1, the input shaft 118 and the carrier C1 of the first epicyclic gear set E1 can also be used as power take-off sources PTO1, PTO2 if desired.

The annulus A1 of the first epicyclic gear set E1 is also connected to the carrier C2 of a second epicyclic gear set E2. The annulus A2 of the second epicyclic gear set E2 is connected to and rotates with the output of the variator V via the intermediate gear 126. A plurality of planet gears P2 are rotatably mounted on the carrier C2 and mesh with the sun gear S2 and with the annulus A2. The sun gear S2 forms the output of the second epicyclic gear set E2.

The epicyclic gear sets E1 and E2 are located below, i.e. underneath, the variator V.

As will be explained, by providing a plurality of clutches, drive can be transmitted from the first and second epicyclic gear sets E1, E2 and from the output discs 112 of the variator to a final output shaft 130 of the transmission arranged in parallel with the input shaft 118. Optionally, rotation of the final transmission output shaft 130 can also selectively be imparted to a further, coaxial output shaft 132 by means of a further clutch 134, for example to provide four-wheel drive when desired.

The output of the second epicyclic gear set E2, formed by the sun gear S2, is connected to one side of a low-regime dog clutch L. The other side of the low-regime clutch L is secured to an intermediate gear 136 which is engaged via a first idler gear 140 to a further intermediate gear 142 (i.e., reduction gearing R5 shown in FIG. 4) which rotates with an intermediate output shaft 144 which engages via a further idler gear 146 with a transfer gear 148 (i.e., reduction gearing R7 shown in FIG. 4) which is connected to one side of the forward clutch F. By engaging the low-regime clutch L, the output of the second epicyclic gear set E2 can thereby be transmitted to the intermediate output shaft 144 and from there to the output shaft 130.

The output of the first epicyclic gear set E1, formed by annulus A1, is transmitted via intermediate gear 150 to one side of an intermediate-regime dog clutch I via reduction gearing R4 shown in FIG. 4, the other side of the intermediate clutch I being connected to the intermediate output shaft 144. Consequently, by engagement of the intermediate clutch I, the output of the first epicyclic gear set E1 (the rotation of the annulus A1) can be transmitted to the transmission output shaft 130.

The intermediate gear 126 rotatable by engagement with the output discs 112 of the variator V (via the idler gear 24) is also arranged to engage with, and rotate, one side of a high regime dog clutch H via reduction gearing R8 shown in FIG. 4. The opposite side of the high regime clutch H is connected directly to the intermediate output shaft 144 and engagement of the high regime clutch thereby transmits the rotation of the variator output directly to the transmission intermediate output shaft 144.

The output of the intermediate output shaft 144 is transmitted to the transmission output shaft 130 either through a forward direction plate clutch F (via the transfer gear 142 connected to the intermediate output shaft 144, the idler gear 146 and a transfer gear 148 connected to one side of the forward direction clutch) or through a reverse direction plate clutch R (one side of which rotates with the intermediate output shaft 144, the other side of which is connected via a first transfer gear 166 which engages with a transfer gear 168 (i.e., reduction gearing R6 shown in FIG. 4) connected to the transmission output shaft 130). Only one of the forward direction clutch and rear direction clutch F, R is engaged at any one time, whereby the output of the intermediate output shaft 144 is connected to the transmission output shaft 130 either in the forward direction (by engagement of clutch F) or in the reverse direction brackets by engagement of clutch R). In this way, the transmission can be arranged to provide identical ratio spreads in both the forward and reverse directions.

In operation, only one of the low-regime clutch L, the intermediate regime clutch I, the intermediate reverse clutch IR and the high-regime clutch H is normally engaged at any one time.

In low-regime operation, only the low-regime clutch L is engaged, which provides an output to the transmission output shaft 130 corresponding to the output (the annulus A2) of the second epicyclic gear set E2 via the intermediate shaft 144. As the rollers of the variator V move, the ratio of the variator can change from reverse, through geared neutral, to low forward ratio. This rotation is transmitted to the intermediate output shaft 144 and thence to the transmission output shaft 130, the direction of rotation of the output shaft 130 being dependent on which of the forward or reverse clutches F, R is engaged.

When the low-regime clutch L is engaged, the highest forward ratio of the variator corresponds to the lowest ratio of the variator when the intermediate clutch I is engaged. Consequently, in order to increase ratio, the low regime clutch L is disengaged and the intermediate clutch I is engaged. This rotation is transmitted to the intermediate output shaft 144 and thence to the transmission output shaft 130, the direction of rotation of the output shaft 130 being dependent on which of the forward or reverse clutches F, R is engaged. This connects the output of the first epicyclic gear set (the annulus A1) to the output shaft 130 via the intermediate shaft 144 and the variator rollers can then sweep in the opposite direction to take the ratio from intermediate forward ratio to the lower end of the next highest ratio range.

When the intermediate regime clutch I is engaged, the highest ratio of the intermediate range corresponds to the lowermost ratio of the next highest regime. In order to increase the effective ratio, the high regime clutch H is engaged and the intermediate regime clutch I is disengaged. This rotation is transmitted to the intermediate output shaft 144 and thence to the transmission output shaft 130, the direction of rotation of the output shaft 130 being dependent on which of the forward or reverse clutches F, R is engaged, This connects the output of the variator V to the output shaft 130 via the intermediate shaft 144 and the rollers of the variator can then sweep in the opposite direction to take the ratio from the lower end of the high regime to an even higher ratio.

The transmission can be "shuttled" very quickly between forward and reverse operation, if desired, by engaging/disengaging the forward and reverse clutches F, R.

As for the first embodiment, the use of a double shunt across the variator recirculates power through the variator and limits the power passing through it. This allows a variator of reduced size to be used, particularly in vehicles such as excavators which are often required to deliver high torque when moving at low or zero road speed.

Moreover, the arrangement of the shunt offset to, but parallel to, the variator, permits the transmission system to be constructed in an envelope which is within the envelope of existing, conventional gearing arrangements.

The invention is not restricted to the details of the foregoing embodiments.

The invention claimed is:

1. A multi-regime, continuously variable ratio transmission (CVT) comprising:
   a transmission input shaft;
   a transmission output shaft;
   a ratio varying unit having a rotating input and a rotating output, the rotational axes of the input and the output being coaxial;
   a shunt including first and second epicyclic gear sets connected across the ratio varying unit, the first epicyclic gear set including a first input driven by the transmission input shaft and a second input driven by a first side of the ratio varying unit and the second epicyclic gear set including a first input from the first epicyclic gear set and a second input from a second side of the ratio varying unit, the first and second epicyclic gear sets being mounted on a common shaft rotating about a common axis, wherein the common shaft is offset with respect to, and parallel to, the rotational axes of the input and output of the ratio varying unit, wherein the first and second epicyclic gear sets are offset radially from and parallel to the ratio varying unit and are at least substantially within a longitudinal profile of the ratio varying unit; and
   a clutch for selectively connecting an output of the second epicyclic gear set to the transmission output shaft.

2. The CVT of claim 1, further comprising one or more additional clutches for selectively connecting the output of the ratio varying unit to the transmission output shaft.

3. The CVT of claim 2, wherein selective engagement of the clutches produces a plurality of overlapping ratio ranges.

4. The CVT of claim 1, wherein the ratio varying unit includes a rotatable input disc, a rotatable output disc mounted coaxially with the input disc and a plurality of rollers of variable inclination transmitting rotation between the input disc and the output disc.

5. The CVT of claim 4, wherein the input disc and the output disc are mounted on a hollow shaft and the transmission input shaft passes through the hollow shaft.

6. The CVT of claim 2, wherein an output of each of the clutches is adapted to drive a common rotatable member and wherein the transmission further comprises a forward clutch and reverse clutch located between the common member and the transmission output shaft.

7. The CVT of claim 1, wherein the first and second epicyclic gear sets are located below the ratio varying unit such that, in use, the output shaft is below the input shaft.

8. A multi-regime, continuously variable ratio transmission (CVT) comprising:
   a transmission input shaft;
   a transmission output shaft;
   a ratio varying unit having a rotating input and a rotating output, the rotational axes of the input and the output being coaxial;
   a shunt including first and second epicyclic gear sets connected across the ratio varying unit, the first epicyclic gear set including a first input driven by the transmission input shaft and a second input driven by a first side of the ratio varying unit and the second epicyclic gear set including a first input from the first epicyclic gear set and a second input from a second side of the ratio varying unit, the first and second epicyclic gear sets rotating about a common axis and being offset with respect to, and parallel to, the rotational axes of the input and output of the ratio varying unit; and
   a clutch for selectively connecting an output of the second epicyclic gear set to the transmission output shaft;
   wherein the ratio varying unit includes a rotatable input disc, a rotatable output disc mounted coaxially with the input disc and a plurality of rollers of variable inclination transmitting rotation between the input disc and the output disc;
   wherein the input disc and the output disc are mounted on a hollow shaft and the transmission input shaft passes through the hollow shaft.

9. The CVT of claim 8, further comprising one or more additional clutches for selectively connecting the output of the ratio varying unit to the transmission output shaft.

10. The CVT of claim 9, wherein selective engagement of the clutches produces a plurality of overlapping ratio ranges.

11. The CVT of claim 9, wherein an output of each of the clutches is adapted to drive a common rotatable member and wherein the transmission further comprises a forward clutch and reverse clutch located between the common member and the transmission output shaft.

12. The CVT of claim 8, wherein the first and second epicyclic gear sets are located below the ratio varying unit.

13. A multi-regime, continuously variable ratio transmission (CVT) comprising:
   a transmission input shaft;
   a transmission output shaft;
   a ratio varying unit having a rotating input and a rotating output, the rotational axes of the input and the output being coaxial;
   a shunt including first and second epicyclic gear sets connected across the ratio varying unit, the first epicyclic gear set including a first input driven by the transmission input shaft and a second input driven by a first side of the ratio varying unit and the second epicyclic gear set including a first input from the first epicyclic gear set and a second input from a second side of the ratio varying unit, the first and second epicyclic gear sets rotating about a common axis and being offset with respect to, and parallel to, the rotational axes of the input and output of the ratio varying unit;

a clutch for selectively connecting an output of the second epicyclic gear set to the transmission output shaft; and one or more additional clutches for selectively connecting the output of the ratio varying unit to the transmission output shaft;

wherein an output of each of the clutches is adapted to drive a common rotatable member and wherein the transmission further comprises a forward clutch and reverse clutch located between the common member and the transmission output shaft.

14. The CVT of claim 13, wherein selective engagement of the clutches produces a plurality of overlapping ratio ranges.

15. The CVT of claim 13, wherein the ratio varying unit includes a rotatable input disc, a rotatable output disc mounted coaxially with the input disc and a plurality of rollers of variable inclination transmitting rotation between the input disc and the output disc.

16. The CVT of claim 15, wherein the input disc and the output disc are mounted on a hollow shaft and the transmission input shaft passes through the hollow shaft.

17. The CVT of claim 13, wherein the first and second epicyclic gear sets are located below the ratio varying unit.

18. A multi-regime, continuously variable ratio transmission (CVT) comprising:

a transmission input shaft;

a transmission output shaft;

a ratio varying unit having a rotating input and a rotating output, the rotational axes of the input and the output being coaxial and defining a ratio varying unit axis, the ratio varying unit being defined by two input discs, each with a toroidally recessed input surface, at each end of the ratio varying unit and having two toroidal cavities, each cavity being defined by the toroidally recessed input surface and two toroidally recessed output surfaces, each output surface facing a respective one of the input surfaces;

a shunt including first and second epicyclic gear sets connected across the ratio varying unit, the first epicyclic gear set including a first input driven by the transmission input shaft and a second input driven by a first side of the ratio varying unit and the second epicyclic gear set including a first input from the first epicyclic gear set and a second input from a second side of the ratio varying unit, the first and second epicyclic gear sets being mounted on a common shaft rotating about a common axis, wherein the common shaft is offset with respect to, and parallel to, the rotational axes of the input and output of the ratio varying unit, wherein the first and second epicyclic gear sets are offset radially from and parallel to the ratio varying unit and are at least substantially within a longitudinal profile of the ratio varying unit and wherein the shunt does not extend beyond a plane perpendicular to the ratio varying unit axis and equidistant between the input discs; and a clutch for selectively connecting an output of the second epicyclic gear set to the transmission output shaft.

* * * * *